(12) United States Patent
Labusch

(10) Patent No.: US 9,927,279 B2
(45) Date of Patent: Mar. 27, 2018

(54) METHOD FOR ASSEMBLING AND TESTING THE FUNCTIONALITY OF A STRUCTURAL UNIT HAVING A FILL LEVEL GAUGE IN A NON-STATIONARY CONTAINER

(71) Applicant: Kautex Textron GmbH & Co. KG, Bonn (DE)

(72) Inventor: Markus Labusch, Windsor (CA)

(73) Assignee: Kautex Textron GmbH & Co. KG, Bonn (DE)

( * ) Notice: Subject to any disclaimer, the term of this patent is extended or adjusted under 35 U.S.C. 154(b) by 328 days.

(21) Appl. No.: 14/428,715

(22) PCT Filed: Sep. 2, 2013

(86) PCT No.: PCT/EP2013/068076
§ 371 (c)(1),
(2) Date: Mar. 17, 2015

(87) PCT Pub. No.: WO2014/040873
PCT Pub. Date: Mar. 20, 2014

(65) Prior Publication Data
US 2015/0247750 A1    Sep. 3, 2015

(30) Foreign Application Priority Data

Sep. 17, 2012  (DE) .......................... 10 2012 018 273

(51) Int. Cl.
*G01F 25/00* (2006.01)
*G01F 23/00* (2006.01)
(Continued)

(52) U.S. Cl.
CPC .............. *G01F 23/00* (2013.01); *G01B 7/30* (2013.01); *G01F 25/0061* (2013.01); *G01F 23/32* (2013.01); *G01F 23/36* (2013.01)

(58) Field of Classification Search
CPC ...... G01F 23/00; G01F 25/0061; G01F 23/32; G01F 23/36; G01B 7/30
(Continued)

(56) References Cited

U.S. PATENT DOCUMENTS 7,013,728 B2    3/2006  Okada et al.
2003/0000304 A1*  1/2003  Wetor ..................... G01F 23/38
                                                   73/305

(Continued)

FOREIGN PATENT DOCUMENTS

DE  102004062100 A1  7/2006
GB  667458          2/1952
GB  1473939         5/1977

OTHER PUBLICATIONS

PCT International Search Report dated Jan. 7, 2014, received in corresponding PCT Application No. PCT/EP13/68076, 2 pgs.
(Continued)

*Primary Examiner* — Helen Kwok
*Assistant Examiner* — Nashiyma Fayyaz
(74) *Attorney, Agent, or Firm* — Grossman Tucker Perreault & Pfleger, PLLC

(57) ABSTRACT

The invention relates to a method for assembling and testing the functionality of a structural unit having a fill level gauge in a non-stationary container for liquids, said container being embodied from thermoplastic synthetic material, wherein the method comprises testing a first and second angular position of a lever arm of the fill level gauge when the latter is in the installed position under the influence of a magnetic field on the empty container.

11 Claims, 1 Drawing Sheet

(51) Int. Cl.
    *G01B 7/30*     (2006.01)
    *G01F 23/32*     (2006.01)
    *G01F 23/36*     (2006.01)

(58) Field of Classification Search
    USPC ......................................................... 73/1.73
    See application file for complete search history.

(56) References Cited

U.S. PATENT DOCUMENTS

2003/0029223 A1    2/2003    Taylor, III et al.
2006/0137429 A1*  6/2006    Henschel ............ G01F 25/0061
                                                                                   73/1.73
2011/0000297 A1    1/2011    Ford

OTHER PUBLICATIONS

PCT Written Opinion dated Jan. 7, 2014, received in corresponding PCT Application No. PCT/EP13/68076, 6 pgs.
PCT International Preliminary Report on Patentability dated Sep. 30, 2014, received in corresponding PCT Application No. PCT/EP13/68076, 6 pgs.

* cited by examiner

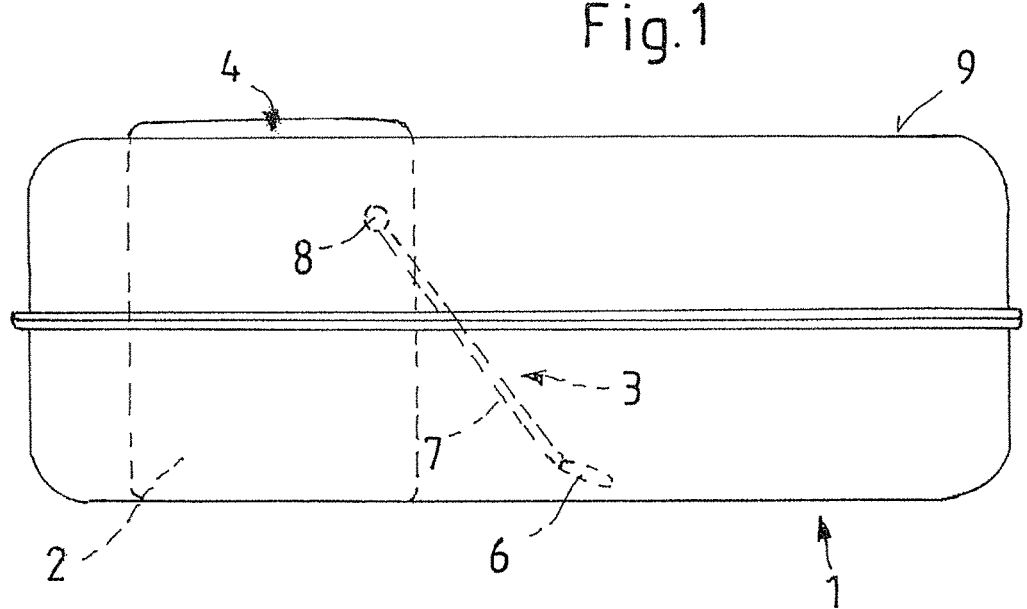
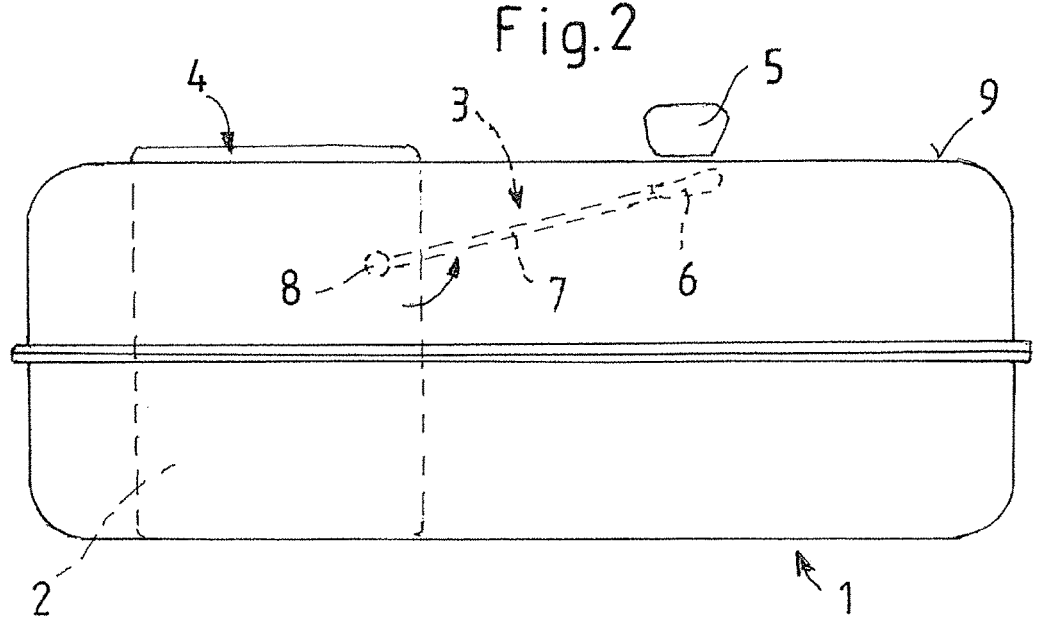

METHOD FOR ASSEMBLING AND TESTING THE FUNCTIONALITY OF A STRUCTURAL UNIT HAVING A FILL LEVEL GAUGE IN A NON-STATIONARY CONTAINER

The invention relates to a method for assembling and testing the functionality of a structural unit having a fill level gauge in a non-stationary container for liquids, said container being embodied from thermoplastic synthetic material, wherein the fill level gauge is embodied as a lever sensor having a lever arm that is arranged on a lever arm bearing in a pivotable manner, said lever arm being able to pivot between at least a first and a second angular position, and said lever sensor having a float that is fastened thereto.

Lever sensors of this type have proven to be of value in determining fill levels in particular in fuel tanks for motor vehicles. Generally, lever sensors of this type comprise a float that is embodied from synthetic material or another light material that is buoyant. The float is arranged on the exterior end of a wire lever that in turn can be moved around a horizontal axis of a lever arm bearing in a pivotable manner. The float floats upwards depending on the fill level in the container and rotates the lever arm in the lever arm bearing. This rotational movement is converted into a sensor signal, for example by way of a rotary potentiometer, which generates a signal that is proportional to the fill level of the container.

Containers that are embodied from synthetic material, for example fuel tanks, are produced as one or multiple parts; specific structural units, such as for example balance tanks or fuel pumps having fill level gauges arranged on said balance tanks or fuel pumps, are generally mounted by way of one or a plurality of inspection openings that can be closed and are provided in the container upon completion of the container. In addition, it is also known to incorporate structural units of this type into the container during the process of molding the container.

In principle, it is necessary to test the functionality of the electrical components inside the container prior to, during or after installation in the container.

GB 667,458 A discloses improvements in float operated electric relays.

GB 1 473 939 discloses a float operated switch assembly.

US 2003/0029223 A1 discloses a fully automated, self testing level sensor.

It is particularly desirable when installing the fill level gauges in the containers to be able to test their functional capability in their final installed position. This is particularly desirable owing to the fact that not only should the electrical function of the rotary potentiometer be possible but it should also be possible to provide the correct indication of the lever sensor in the installed position and if necessary to be able to calibrate said lever sensor. This is due to the possibility that lines that are routed inside the container can block the lever sensor.

The object of the invention therefore is to provide a method for assembling and testing the functionality of a structural unit having a fill level gauge, which method renders it possible in a particularly simple manner to test the functionality of the fill level gauge in its installed position in the container.

This object is achieved in particular by way of the features of claim 1. Advantageous embodiments of the invention are evident in the dependent claims.

In accordance with the invention, a method is provided for assembling and testing the functionality of a structural unit having a fill level gauge in a non-stationary container for liquids, said container being embodied from thermoplastic synthetic material, wherein the fill level gauge is embodied as a lever sensor having a lever arm that is arranged on a lever arm bearing in a pivotable manner, said lever arm being able to pivot between at least a first and a second angular position, and said lever sensor having a float that is fastened thereto, wherein the method comprises testing the first and second angular position of the lever arm under the influence of a magnetic field on the empty container.

The invention advantageously takes advantage of the fact that generally the lever arm of the fill level gauge is embodied as a wire arm, which is embodied from a metal that can be magnetized.

The lever sensor will be displaced in the case of an empty container in a particularly simple manner by virtue of fastening a correspondingly powerful magnetic body to the exterior face of the container. The magnetic field of the magnet can thus be of such a magnitude that, when applying the magnet to the exterior face of the container wall in a corresponding position, a maximum displacement of the lever arm is achieved, which maximum displacement corresponds to the position of the lever arm in the case of a completely full container. Thus, it is rendered possible to test in a simple manner the signal that is generated by the lever arm in the case of the full state of the container but also in the case of the empty state of the container.

The method comprises temporarily arranging a magnetic body externally on a container wall in a predefined position during the process of assembling the structural unit.

The predefined position can be marked for example in advance externally on the container wall.

In the event that the container is produced as one part from thermoplastic synthetic material, it is possible for example for a corresponding mark to have already been engraved in the tool, so that the container carries a permanent position mark for the magnetic body.

In the case of an advantageous variation of the method in accordance with the invention, it is provided that initially the magnetic body is arranged on the container wall and that the structural unit is then arranged in the container in a predefined position in such a manner that the lever arm of the fill level gauge is raised into the first angular position under the influence of the magnetic field.

The fill level gauge is expediently temporarily connected in an electrical manner to a measuring and testing device for the purpose of testing the sensor signal.

The sensor signal is expediently initially tested in the first angular position of the lever arm, said first angular position being assumed by the lever arm under the influence of the magnetic field.

The magnetic body can subsequently be removed so that the lever arm falls into the second angular position, wherein the sensor signal is then tested in the second angular position.

A supply unit for the liquid that is to be received by the container is advantageously installed as a structural unit in the container, which supply unit comprises and/or embodies the lever arm bearing. Alternatively, the lever arm bearing can be provided on a support that is arranged in the container, which support extends between an upper and a lower container wall.

A supply unit of this type can comprise for example a balance tank and a pump that is arranged in the balance tank, and also the lever arm bearing, which comprises a rotary potentiometer, and the electrical connectors for pumps and sensors in a structural unit.

During the process of assembling and testing the functionality of the container, said container is expediently arranged in a defined position in a clamping device that is provided for the container.

As mentioned in the introduction, the container can be embodied for example as a fuel tank for motor vehicles.

The advantage of the method in accordance with the invention can in particular be considered as being that it renders possible a comparatively simple and above all also quick method for testing during assembly that the lever sensor is functioning correctly. It is possible to calibrate the fill level gauge in the case of a pre-mounted and closed container.

The invention is explained hereinunder with reference to the attached drawings. In the drawings:

FIG. 1: illustrates a container that is embodied from thermoplastic synthetic material having a structural unit that is arranged in this container, said structural unit having a fill level gauge in an angular position that approximately corresponds to the empty state of the container and FIG. 2: illustrates a view of the container that is represented in FIG. 1, in which the lever arm of the fill level gauge is raised by means of a magnetic body from the exterior.

FIG. 1 illustrates a fuel tank 1 that is embodied from thermoplastic synthetic material as a container, in which a fuel supply unit 2 having a lever sensor 3 is installed. The fuel tank 1 is greatly simplified in the illustration.

In accordance with a variation of the method in accordance with the invention, the fuel tank 1 having the fuel supply unit 2 and the lever sensor 3 are fully mounted. In the case of this variation of the method, the fuel supply unit 2 was installed by way of an inspection opening 4 in the fuel tank 1; the inspection opening 4 was fully closed.

After assembling the fuel tank 1, said fuel tank is fastened in a clamping device (not illustrated). The fuel tank 1 is not filled in this position.

Thereafter, the fuel supply unit 2 is connected to a measuring and testing device by way of connectors that are provided in a closing cover of the inspection opening 4. The lever sensor 3 is displaced by means of a magnetic body 4 into a first angular position as illustrated in FIG. 2. As is evident from the figures, the lever sensor 3 comprises a float 6 and a lever arm 7, wherein the latter is embodied as a wire lever that can be rotated on the fuel supply unit 2 about a pivot axis 8 that is only represented by an outline in the figure. Under the influence of a magnetic body 5, which was positioned on a predefined and pre-marked position on the exterior wall 9 of the fuel tank 1, the lever arm 7 is raised into the first angular position as illustrated in FIG. 2. This angular position corresponds to the position of the lever arm 7 in the case of a completely filled fuel tank 1. In this position the sensor signal is tested by means of the connected measuring and testing device. Thereafter, the magnetic body 5 is removed, the lever arm 7 falls under the influence of gravity into the second angular position as illustrated in FIG. 1, which renders it possible to test the sensor signal in the second angular position.

Alternatively, the method in accordance with the invention can be implemented during assembly of the fuel supply unit 2. A possible procedure could be, by way of example, that the workman positions the fuel tank 1 in the clamping device. Thereafter, the magnetic body 5 that is fastened by way of example to a pulling tool with a ratchet is arranged and/or placed on the exterior wall 9 of the fuel tank 1 at a correspondingly marked position. Thereafter, the fuel supply unit 2 is installed in the fuel tank through the inspection opening 4 on the fuel tank 1, wherein the lever arm 7 is held and/or pulled up in the uppermost full-position by way of the magnetic body 5 that is located on the exterior wall 9. The fuel supply unit 2 is correspondingly aligned and temporarily fixed in the inspection opening 4. Thereafter, the electrical connection is established between the fuel supply unit 2 and the measuring and testing device that is not illustrated. The full-position of the lever arm 7 is tested, the magnetic body 5 is then removed and a further measurement is taken in the empty-position of the lever arm 7. Subsequently, the fuel supply unit is finally secured in and on the fuel tank 1, for example by way of tightening a corresponding coupling screw connection.

LIST OF REFERENCE NUMERALS

1 Fuel Tank
2 Fuel Supply Unit
3 Lever Sensor
4 Inspection Opening
5 Magnetic body
6 Float
7 Lever Arm
8 Pivot Axis
9 Exterior Wall of the Fuel Tank

What is claimed is:

1. A method for assembling and testing the functionality of a fill level gauge in a non-stationary container for a liquid when the container is empty of the liquid, said container being embodied from thermoplastic synthetic material, wherein the fill level gauge is embodied as a lever sensor having a pivotable lever arm, said lever arm pivotable between at least a first angular position and a second angular position, and said lever sensor having a float that is fastened thereto, wherein the method comprises:
arranging a magnetic body externally on a wall of the container in a predefined position, and
holding the lever arm of the fill level gauge in the first angular position under an influence of a magnetic field of the magnetic body,
removing the magnetic body from the container, whereby the lever arm of the fill level gauge falls into the second angular position,
electrically connecting the fill level gauge to a testing device to test a signal of the level sensor, and
testing the signal of the level sensor.

2. The method as claimed in claim 1, wherein testing the signal of the level sensor is performed in at least one of the first angular position of the lever arm and the second angular position of the lever arm.

3. The method as claimed in claim 1, wherein, after removing the magnetic body such that the lever arm of the fill level gauge falls into the second angular position, and testing the sensor signal in the second angular position of the lever arm.

4. The method as claimed in claim 1, wherein the container includes a fuel supply unit, and the fuel supply unit includes the lever arm mounted thereto.

5. The method as claimed in claim 1, wherein the container is a fuel tank for a motor vehicle.

6. The method as claimed in claim 1, wherein the container has an upper wall and a lower wall and a fuel supply unit extending between the upper wall and the lower wall, and the fuel supply unit includes the lever arm mounted thereto.

7. The method as claimed in claim 1, wherein the lever arm is arranged on a pivot axis on which the lever arm is arranged to pivot.

8. The method as claimed in claim 1, wherein the container includes a structural unit therein, and the lever arm is mounted to the structural unit.

9. The method as claimed in claim 1, wherein the lever arm is formed of metal.

10. The method as claimed in claim 1, wherein the container includes an inspection opening, and the fill level gauge is placed in the container through the inspection opening.

11. The method as claimed in claim 1, wherein the predefined position of the magnetic body is marked on the wall of the container.

* * * * *